Nov. 17, 1953 H. J. B. TOPP 2,659,608
MEANS FOR DELIVERING LIME AND MANURE
FROM MOTOR TRUCKS AND THE LIKE
Filed May 24, 1950 2 Sheets-Sheet 1

Inventor
H. J. B. Topp

Nov. 17, 1953               H. J. B. TOPP             2,659,608
MEANS FOR DELIVERING LIME AND MANURE
FROM MOTOR TRUCKS AND THE LIKE
Filed May 24, 1950                             2 Sheets-Sheet 2

Inventor
H. J. B. Topp

Patented Nov. 17, 1953

2,659,608

UNITED STATES PATENT OFFICE 2,659,608

MEANS FOR DELIVERING LIME AND MANURE FROM MOTOR TRUCKS AND THE LIKE

Hereward J. B. Topp, Mauriceville, Wairarapa, New Zealand

Application May 24, 1950, Serial No. 163,812

5 Claims. (Cl. 275—8)

The invention relates to means for delivering materials such as lime and manure, from motor trucks and the like, and has for its object, the provision for the aforesaid purpose, of improved means, capable of being used to deliver such a material from a truck or the like, either by spreading or distributing it over land over which the truck or the like travels, or by depositing it in a stacked formation, or into another truck or the like, a storage bin, hopper, or other receptacle, or depositing it on another conveyor or distributor, or elsewhere, as required.

According hereto, the invention provides for use in a transport vehicle for delivering therefrom, material such as lime, manure or the like, means comprising a carriage or frame mounted for movement along the floor or bed of said vehicle, and having mounted thereon a material ejector, an elevator for raising the material from the floor of the vehicle to said ejector, worm conveyors at the lower end of the elevator for feeding material thereto, means for operating said worm conveyors, said elevator and said ejector and means for moving the carriage or frame along the bed or floor of the vehicle.

Figure 1:
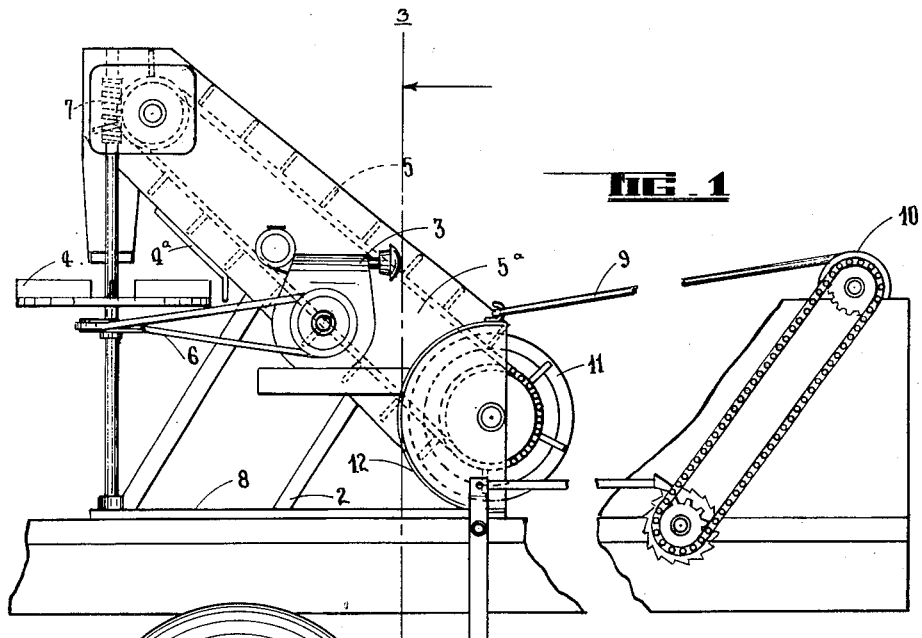
Figure 2:
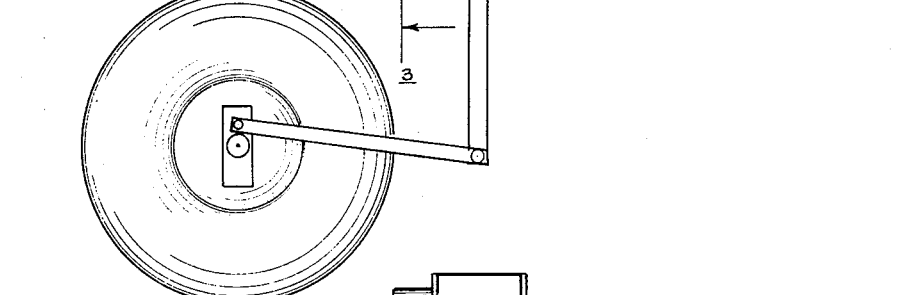
Figure 3:
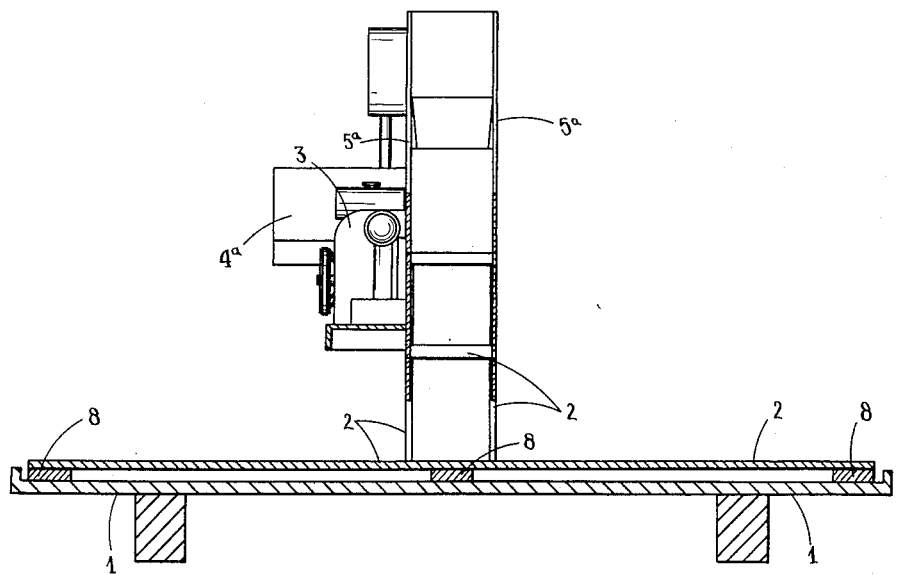

In the accompanying drawing in conjunction with which the invention will be more particularly described, Figure 1 is a fragmentary side elevational view illustrating the invention mounted on a truck with the side walls of the truck removed, Figure 2 is a front elevational view illustrating certain components of the invention as viewed looking from the right in Figure 1, and Figure 3 is a sectional view taken along line 3—3 of Figure 1 with the elevator removed.

In carrying out the invention, there is provided for travel along the floor 1 of a truck, trailer, or the like, used for transporting material such as lime, manure, or the like, a carriage or frame 2, on which is mounted a power unit 3, which can be a petrol motor, a material ejector 4, an elevator 5 for raising material from the floor 1 of the truck or the like to the ejector 4, the latter and the elevator 5 being operated through any suitable form of gearing 6, 7 from the aforesaid power unit 3.

The carriage or frame 2 can be mounted on wheels, or as shown in Figure 3, on skids 8, so as to be capable of being caused to travel along on the floor 1 of the truck, trailer, or the like, and preferably is adapted to be drawn along on said floor by a rope or ropes 9 attached to said carriage or frame 2 and adapted to be wound on to a drum 10 mounted on the truck, trailer, or the like, said drum 10 preferably being driven through ratchet and pawl gearing from a running wheel of the truck or the like, although if desired the travel of the carriage or frame 2 can be effected manually.

The lower end of the elevator 5 is provided with preferably worm or paddle type conveyors 11 adapted to operate transversely of the longitudinal axis of the truck or the like, and in or against plates or housings 12 supported by the frame 2 and skids 8, so as to collect material and feed same to the lower end of the elevator 5, as the carriage or frame 2 is caused to travel along on the floor 1 of the truck or the like, to enable material to be removed from over the full area thereof.

The elevator 5 can be of any suitable form, such as a chain with scrapers thereon operating in a chute 5a, the material raised being delivered from the upper end of the elevator 5 on to the ejector 4, for distribution over the land over which the truck or the like travels, or for delivery as otherwise required.

The ejector 4 can comprise a single or a plurality of rotary disc spinners with vanes or ribs thereon and which discs may be concave or otherwise, and be operated at speed behind a guard 4a so as to distribute or broadcast material delivered thereon, over the land over which the truck or the like travels, and clear of the latter.

The feed of material to the elevator, and the travel of the carriage or frame along the floor of the truck or the like, can be regulated by change speed gearing in the drive to the winding in drum aforesaid, or by driving the latter through suitable gearing from a power take "off" point on the power unit.

Means are provided for putting the winding-in drum out of action, upon the carriage or frame reaching the limit of its travel, and so as to enable said carriage or frame to be returned along the body of the truck or the like, said means being actuated by the carriage or frame to disconnect the drive to the drum.

What I do claim and desire to obtain by Letters Patent of the United States of America is:

1. Means for delivering lime, manure and like material from a transport vehicle including a body having a bed upon which the material rests, comprising a frame including means supporting the same for movement along the bed longitudinally thereof, means for moving said frame along the bed, material ejector means supported by the frame and located above the bed, an elevator also supported by the frame and disposed for raising material from a level adjacent the bed up to and to said ejector means, worm conveyor means likewise supported by the frame, extending transversely of the longitudinal axis of the vehicle for feeding material to said elevator, and drive means including power transmission means carried by said frame for driving said ejector means, said elevator and said conveyor means.

2. Means for delivering lime, manure and like material from a transport vehicle as defined in and by claim 1 wherein said frame is slidably mounted on a vehicle bed, said means for moving said frame along the bed including a drum mounted on said vehicle and cable means attached between said frame and said drum whereby winding of the cable upon said drum slides the frame longitudinally of the bed.

3. Means for delivering lime, manure and like material from a transport vehicle as defined in and by claim 2 and means for winding cable upon said drum comprising gearing operably connected with said drum, said vehicle having a running wheel and means operably connected between said running wheel and said gearing for actuating said drum.

4. Means for delivering lime, manure and like material from a transport vehicle as defined in and by claim 1 and wherein said ejector means comprises at least one rotary spinner.

5. Means for delivering lime, manure and the like material from a transport vehicle including running gear, a body including a bed and opposite side walls each terminating in upper marginal edges and defining an enclosure for the material to be delivered, a frame including skid means slidably supported on the bed of said body for movement longitudinally therealong, a power plant supported on said frame, a vertically disposed shaft carried by said frame, a rotary spinner ejector means carried by said shaft at substantially the same level as the upper terminal margins of the side walls, said shaft including a portion extending above said rotary spinner, a chute supported by said frame extending at an angle with respect to the bed and terminating in an upper end superjacent said spinner, an endless elevator including opposite ends movably mounted within said chute and including scraper means operable to transfer material from a level adjacent said bed up above and onto said spinner, said chute being disposed substantially centrally of the bed, a housing supported by the frame adjacent the lower end of the chute and extending transversely of the axis of the vehicle and terminating in opposite ends, said housing having a central opening therein accommodating said chute, a cross shaft extending within said housing transversely of the axis of the vehicle and means operably connecting one end of said elevator to said cross shaft, drive means operably connected between the upwardly extended portion of said vertical shaft and the opposite end of said elevator, and worm conveyor means carried by said cross shaft and extending between said chute and the respective opposite ends of said housing, said worm conveyor means being oppositely disposed to feed material toward said elevator, transmission means operably connecting said power plant with said vertical shaft for simultaneously operating said spinner, elevator and worm conveyor and means supported by the vehicle and operably connected with said frame for moving the frame longitudinally of the vehicle.

H. J. B. TOPP.

References Cited in the file of this patent
UNITED STATES PATENTS

| Number | Name | Date |
|---|---|---|
| 1,251,372 | Hewitt | Dec. 25, 1917 |
| 1,259,739 | Hinkle | Mar. 19, 1918 |
| 1,764,019 | Hardenbergh | June 17, 1930 |
| 1,767,017 | Scheckler | June 24, 1930 |
| 2,553,455 | Higby | May 5, 1951 |